United States Patent Office 3,046,251
Patented July 24, 1962

3,046,251
PROCESS FOR THE ACYLATION OF POLYOXY-
METHYLENES
Kuno Wagner, Leverkusen, Germany, assignor to Farbenfabriken Bayer Aktiengesellschaft, Leverkusen, Germany, a corporation of Germany
No Drawing. Filed Mar. 9, 1960, Ser. No. 13,708
Claims priority, application Germany Mar. 11, 1959
18 Claims. (Cl. 260—67)

This invention relates to high molecular weight polyoxymethylenes and more especially to an improved process of acylating such polyoxymethylenes.

It is known to carry out the acylation of polyoxymethylenes with organic acid anhydrides in the presence of acylation catalysts (such as zinc chloride or sulphuric acid) and substances having a buffering action (for example sodium acetate), or acid-fixing agents (such as for example tertiary organic bases). (See H. Staudinger, "Die hochmolekularen organischen Verbindungen," published by Jul. Springer, Berlin, 1932, page 277.)

When using this process, however, a degradation of the polyoxymethylene chains is not excluded, even under the gentlest condition (H. Staudinger and collaborators, Liebigs Ann. Chem. 474, page 175 (1929)). For example, when acetylating with acetic acid anhydride, even in the presence of pyridine as acid-fixing agent, the mainly interesting reaction products of average molecular weight which can be drawn to form filaments and show relatively high elasticity in the processed condition, are increasingly destroyed as the length of the heating period increases. In order to prevent this degradation, an effort has been made as far as possible to avoid extending the time periods necessary for the acetylation beyond several hours, or to limit these periods to a maximum of one half to one hour (Liebigs Ann. Chem., loc. cit). However, even with these short reaction times, it is not possible to avoid an appreciable degradation or loss of yield of high molecular weight polyoxymethylenes, with formation of readily soluble low-molecular and valueless oligomeric polyoxymethylene diacetates. Consequently, with for example gentle acetylation in a neutral solvent, such for example as dimethyl formamide, at approximately 140° C., it is usually not possible to prevent a loss in yield of at least 16%, after only one hour. Similarly, a heterogeneous acetylation usually proceeds with a similar loss of yield. Furthermore, since this topochemical reaction with the formation of high-molecular polyoxymethylene crystallites proceeds more slowly, it is not possible to obtain fully reacted products within the short reaction times which are permitted, but mixtures of diacetates, acetate hydrates and unmodified polyoxymethylene dihydrates (see H. Staudinger, "Die hochmolekularen organischen Verbindungen," published by Jul. Springer (1932), page 233). If an attempt is made to carry out a more thorough acetylation under high pressure and at temperatures near the melting point of the polyoxymethylenes, the loss in yield usually exceeds 50% of valuable products. This loss is further increased together with increasing reaction sluggishness when other acid anhydrides are involved.

It has now been found that acylation of high molecular weight polyoxymethylenes can produce valuable end products with practically no loss in yield, and if desired a controlled degradation of the polyoxymethylene chain can be simultaneously effected if the reaction of the polyoxymethylenes with acylation agents known per se is carried out in the presence of monoisocyanates or polyisocyanates.

Suitable for carrying out the process of the invention are isocyanates of the aliphatic, cycloaliphatic, aromatic or araliphatic series, such for example as:

Aliphatic monoisocyanates, the alkyl group of which has 2–20 carbon atoms and may be substituted by halogen atoms and may be interrupted by hetero atoms such as oxygen (ethyl-, propyl-, butyl-, ω-chlorohexyl-, octadecyl-, γ-ethoxypropylisocanate)

Cycloaliphatic monoisocyanates, the cycloaliphatic ring of which may be substituted, such as by alkyl or alkoxy groups (cyclohexyl-, methoxycyclohexyl isocyanate)

Aromatic monoisocyanates, which may be substituted in the aromatic ring such as by halogen atoms, nitro-, alkoxy-, alkyl-, esterified carboxylic acid groups (phenyl-, tolyl-, naphthyl-, diphenyl-, p-methoxyphenyl-, p-nitrophenyl-, p-chlorophenyl-, m-bromophenyl isocyanate, p-isocyanato benzoic acid methyl-, ethyl-, propyl-, butyl-, cyclohexyl ester)

Monoisocyanates containing urethane groups as they are obtained by reaction of 1 mol of one of the diisocyanates recited below with 1 mol of a monohydric alcohol such as ethanol, propanol, butanol, hexanol, cyclohexanol Aliphatic diisocyanates such as tetra- or hexamethylene diisocyanate Aromatic diisocyanates which may be substituted as the above aromatic monoisocyanates (tolyl-2,4-, tolyl-2,6-, diphenylmethane-4.4′-, phenylene-1.4-, phenylene-1.3-, naphthylene-1.5-, 1-methyl-3.5-diethylbenzene-2.4-, 1-methoxy-benzene-2,4-, 1-chlorobenzene-2.4-diisocyanate Cycloaliphatic diisocyanates (cyclohexane-diisocyanate)

Di- and triisocyanates as they are obtained by reaction of 1 mol of a dihydric alcohol (ethylene-, diethylene-, triethylene glycol, propylene-, butylene glycol) with 2 mols of a diisocyanate or by reaction of 1 mol of a trihydric alcohol (glycerol, trimethylolpropane, hexanetriol) with 3 mols of a diisocyanate such as tolylene-2.4-diisocyanate.

It is advantageous to use aromatic isocyanates for the process of the invention, since they are the most reactive towards free acids, and also react most quickly with the terminal hydroxyl groups of the polyoxymethylenes, and furthermore are exchanged most rapidly from the reaction products for acyl radicals at elevated temperature.

Acylation with the aid of one or more representatives of the aforesaid class of compounds is carried out in conjunction with the conventional acylation agents, i.e., aliphatic, cycloaliphatic, araliphatic and aromatic carboxylic acid anhydrides, as for example the anhydrides of monocarboxylic acids having 1 to 20 carbon atoms being devoid of non-benzenoid unsaturation (acetic, propionic, stearic, benzoic, cyclohexylcarboxylic, phenylacetic acid anhydride) furthermore phthalic, maleic and succinic acid anhydrides as well as substituted derivatives of these acid anhydrides and mixtures of these anhydrides with one another, anhydrides of monocarboxylic acids, especially acetic anhydride being preferred.

The process can be employed with polyoxymethylenes in general, but only substances with average molecular weights corresponding to an intrinsic viscosity of 0.5 (as measured in a 0.5% solution in dimethylformamide at 150° C.) and upwards are of technical interest.

The acylation can be carried out in heterogeneous reaction, in which the acylation agent serves as reaction medium, in the presence of an inert liquid which has no swelling action on the polymer or in the presence of solvent agent which is applied in such amounts that it either dissolves or swells the polymer. The swelling is effected with a quantity of solvent which is insufficient for complete dissolution. Suitable solvents for this purpose are: diacylated thiodiglycol such as thiodiglycol diacetate or propionate, diacylated polythioethers of the formula

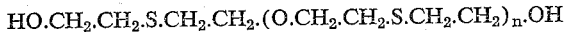

in which *n* is a whole integer of about 1 to 20 and polyglycolethers having a molecular weight of about 300 to 2000, dimethyl formamide, dimethyl acetamide, tetramethyl urea, disubstituted malonic acid alkyl esters such as α-dimethyl or diethyl malonic acid diesters with methanol or ethanol, and esters of phenyl ethyl alcohol with monocarboxylic acids such as acetic or propionic acid.

There is no strict upper limit for the quantity of isocyanate to be used, but in most cases 0.5 to 26, preferably 2 to 10 parts by weight of isocyanate can be used for every 100 parts by weight of acid anhydride. The quantity of acid anhydrides can vary within wide limits and it depends on the molecular weight of the polyoxymethylenes, the swelling power thereof, the stirring speed and similar factors. Generally speaking, it is advantageous to use 2 to 50, preferably 5 to 30 parts by weight of acid anhydride per part by weight of polyoxymethylene. As calculated on 100 parts by weight of polyoxymethylene there may be applied .5 to 200, preferably 10 to 150 parts by weight of isocyanate.

As regards reaction time and temperature, the range from ½ to 50 hours being preferred as regards the former and the range from 50 to 200° C., especially 100 to 180° C. as regards the latter. Furthermore, it is advisable in many cases to work in an inert gas atmosphere, such as nitrogen, argon, helium, methane, ethane, propane. In order to increase the reaction velocity during acylation, it is desirable for catalytic quantities of tertiary organic nitrogen bases, salts of the alkali metals and/or alkaline earth metals with weak organic acids and the like to be added to the mixtures in known manner. Such catalysts are for instance sodium acetate, propionate, stearate or the corresponding potassium salts, secondary sodium phosphate, trimethylamine, triethylamine, dimethylbenzylamine, peralkylated polyalkylene polyamines and alkylenediamines, pyridin, N-methyl morpholine. The salts are usually applied in amounts of about 0.1 to 5, and the nitrogen bases in amounts of about 0.1 to 50 parts by weight per 100 parts by weight polymer.

According to another form of the process it is possible to effect the acylation in the presence of isocyanates at temperatures above 100° C. under elevated pressure up to about 50 atmospheres and thus simultaneously to effect a thermal splitting of polyoxymethylenes of the viscosity range above about 1.9 into those of the range from about 0.5 to 1.7.

The favourable influence of isocyanates on the course of the acylation reaction is to be indicated by the following comparison: Whereas a loss in yield of about 42% is found in the reaction of for example acetic acid anhydride with a high-molecular polyoxymethylene of the intrinsic viscosity of 2.3 (measured in a 0.5% dimethyl formamide solution at 150° C.) in the presence of sodium acetate, pyridine and the like at 139° C., after an acetylation period of 15 hours in the absence of isocyanates, it is practically impossible to detect a loss in yield when an isocyanate, such as for example phenyl isocyanate or tolyl-2.4-diisocyanate is added. If such a loss is detected, only a slight fall in the intrinsic viscosity is observed. At 174° C. and elevated pressure, for example 10 atm., the loss in yield of high-molecular polyoxymethylenes after an acetylation period of 1½ hours without addition of isocyanate is almost 60% and the intrinsic viscosity has fallen to about 0.45, the products yielding brittle and unusable elements, while the loss in yield in the presence of isocyanates is only 6–10%, that is to say, 94–90% of a substance of high molecular weight is still obtained. The intrinsic viscosity of the products in dimethyl formamide has fallen from 2.3 to 1.1 and consequently a viscosity range has been reached which is in the most valuable molecular weight range of the polyoxymethylenes.

Using the process of the invention, the presence of isocyanates in the acylation reaction practically prevents the degradation of the polyoxymethylene chain by traces of acids, or it is only possible for the substantially slower degradation by thermal splitting to take place. This slow splitting reaction is however generally advantageous, since it permits the transition from the range of the polyoxymethylenes of relatively low elasticity and of high molecular weight, which are more difficult to process, into a range which are more difficult to process, into a range which is distinguished by improved elasticity of the products and also the properties enabling the products to be drawn into filaments. This range is essentially at an intrinsic viscosity of the polymer of 0.6 to 1.9 in dimethyl formamide (0.5%). These products also have more advantageous processing properties, because of their better flowing power.

The acylated polyoxymethylenes which can be produced by the process of the invention constitute valuable products for the production of plastic compositions which can if desired be deformed or shaped with or without addition of plasticizers, fillers, stabilisers and the like.

In the following examples, the parts given are parts by weight, unless otherwise indicated.

*Example 1*

20 parts of a high molecular weight polyoxymethylene having an intrinsic viscosity of 2.3 (measured in dimethyl formamide at 150° C.) are acetylated in a heterogeneous reaction by treating the said polyoxymethylene with 400 parts of acetic anhydride, 20 parts of phenyl isocyanate (or 10 parts of tolyl-2.4-diisocyanate) and 0.7 part of sodium acetate in a nitrogen atmosphere for 15 hours at 139–140° C. The acetylated polyoxymethylene is filtered off from the cooled reaction solution, freed from acetic anhydride by washing several times with acetone and methanol, freed from traces of sodium acetate by washing with water, and dried after a further treatment with acetone. Without any appreciable loss in yield, due to formation of readily soluble polyoxymethylene diacetates of low molecular weight, a stabilised polyoxymethylene of high molecular weight is obtained. Yield: 19.4 g.=97% of the quantity introduced.

If the same reaction is carried out with the same proportions but in the absence of phenyl isocyanate and if heterogeneous acetylation is carried out as above for 15 hours at 139–140° C., a loss in yield of 45–46% is obtained when using the same working up procedure.

*Example 2*

50 parts of the high molecular weight polyoxymethylene (as in Example 1) are acetylated with 500 parts of acetic anhydride, 0.8 part of sodium acetate and 25 parts of phenyl isocyanate for 90 minutes under nitrogen at 160° C. and under a pressure of 9–10 atm. After purifying and drying the stabilised high molecular weight polyoxymethylene, 47 parts of a high-molecular stabilised polyoxymethylene are obtained without any relatively large loss in yield (loss in yield is 3 g.=6% of the quantity used). If for comparison purposes the corresponding acetylation is carried out with the same components but not adding phenyl isocyanate, a considerable loss in yield is observed, due to formation of oligomeric polyoxymethylene diacetates and formation of readily soluble, distillable polyoxymethylene diacetates (loss in yield is 24 parts=48%).

*Example 3*

The procedure of Example 2 is followed with the same components, but using only about 3.9 parts of anhydride to 1 part of polyoxymethylene, so that the anhydride is completely absorbed by the polyoxymethylene and finally a moist polyoxymethylene paste is present; by way of example, 432 parts of high-molecular polyoxymethylene are mixed with 1680 parts of acetic anhydride and 3.2 parts of sodium acetate and thereafter 60 parts of tolyl-2.4-diisocyanate are added. Acetylation takes place at 3-10 atm. gauge in a nitrogen atmosphere, the temperature being allowed to rise to 84° C. in the course of another hour and thereafter it is heated within 1½ hours to 158° C., while finally the temperature is brought up to 178° C. within another half an hour. After working up and drying, 405 parts of stabilised polyoxymethylene are obtained.

The loss in yield in this case is 6%. The intrinsic viscosity of the acetylated polyoxymethylene has in a favourable manner fallen to 0.98 (measured in dimethyl formamide at 150° C.). The products can be easily melted, drawn to form filaments, are elastic and ductile and, because of a better flowing power, can be more easily worked than the starting product.

If the same experiment is carried out without adding isocyanate, a loss in yield of 50-60% due to formation of low-molecular polyoxymethylene diacetates is found after working up and drying when the reaction has been conducted in a similar manner.

*Example 4*

10 parts of a high molecular weight polyoxymethylene (as in Example 1) are dissolved in a mixture of 200 parts of thiodiglycol diacetate and 100 parts of a mixture of 10 parts of phenyl isocyanate and 90 parts of benzoic anhydride as well as 0.4 part of sodium acetate at 155-156° C. to form a highly viscous solution and acylated in a period of 4 hours while maintaining this temperature. After working up and purifying in accordance with Example 1, the polyoxymethylene introduced is obtained in a practically quantitative manner in acylated form.

*Example 5*

20 parts of a high molecular weight polyoxymethylene having an intrinsic viscosity of 1.4 (measured in a 0.5% solution of the polymer in dimethylformamide at 150° C.) are mixed with 600 parts of acetic anhydride, 0.6 part of sodium acetate and:

(a) 15 parts of diphenylmethane-4.4′-diisocyanate or
(b) 18 parts of diphenylsulfide-4.4′-diisocyanate or
(c) 18 parts of 1-methoxybenzene-2.4-diisocyanate The mixture obtained is refluenced in a nitrogen atmosphere for 20 hours at 139° C. The working up of the reaction mixture is carried through as in Example 1. Yield 19.3 parts=97% (calculated on polyoxymethylene introduced) of a high molecular polyoxymethylenediacetate.

*Example 6*

The procedure is as in Example 5 with the variation that a polyoxymethylene of an intrinsic viscosity of 0.95 (20 parts) and the following isocyanates are used:

(a) 10 parts of hexamethylenediisocyanate or
(b) 12 parts of tetramethylenediisocyanate or
(c) 10 parts of benzylisocyanate or
(d) 10 parts of cyclohexane-1.4-diisocyanate Yields: 19-19.5 parts=95-97% (calculated on polyoxymethylene applied) of high molecular polyoxymethylenediacetates.

As shown above the acylation may be carried through in the presence of inert organic liquids which do neither swell or dissolve the polymers. Suitable liquids of this type are aliphatic and aromatic hydrocarbons which may be halogenated, such as decaline, cyclohexane, benzene, toluene, xylene, these liquids being preferably used in amounts of about 0.1 to 2 parts by weight per 1 part by weight of polymer. When the reaction is to be carried out in solution, the above cited solvents such as thiodiglycoldiacetate may be used in amounts of 6 to 30 parts by weight per 1 part of polymer whereas with the application of about 0.5 to 5 parts in most cases only swelling of the polymer occurs.

What is claimed is:

1. A process of acylating a solid, film-forming high molecular polyoxymethylene which comprises contacting 1 part by weight of said high molecular polyoxymethylene at temperatures of about 50-200° C. with at least 2 parts by weight of a carboxylic acid anhydride and about 0.5-20 parts by weight of an organic isocyanate having as the sole reactive group at least one isocyanate group per 100 parts by weight of said anhydride.

2. Process of claim 1 wherein the polyoxymethylene has an intrinsic viscosity of at least 0.5 as measured in a 0.5% solution in dimethyl formamide at 150° C.

3. Process of claim 1 wherein an acylating catalyst is additionally used.

4. Process of claim 1 wherein said temperature is 100-180° C.

5. Process of claim 4 wherein said acylating agent is an anhydride of an organic monocarboxylic acid.

6. Process of claim 5 wherein said anhydride is acetic acid anhydride.

7. An acylated high molecular solid, film-forming polyoxymethylene as obtained by the process of claim 1.

8. A process of acylating a solid, film-forming high molecular polyoxymethylene which comprises contacting 1 part by weight of said high molecular polyoxymethylene at temperatures of about 50-200° C. with at least 2 parts by weight of a carboxylic acid anhydride and about 0.5-20 parts by weight of an alkyl monoisocyanate, the alkyl group of which has 2-20 carbon atoms and which may be substituted by halogen atoms and may be interrupted by hetero atoms.

9. A process of acylating a solid, film-forming high molecular polyoxymethylene which comprises contacting 1 part by weight of said high molecular polyoxymethylene at temperatures of about 50-200° C. with at least 2 parts by weight of a carboxylic acid anhydride and about 0.5-20 parts by weight of a cycloaliphatic monoisocyanate, the cycloaliphatic ring of which may be substituted by a member selected from the group consisting of alkyl and alkoxy groups.

10. A process of acylating a solid, film-forming high molecular polyoxymethylene which comprises contacting 1 part by weight of said high molecular polyoxymethylene at temperatures of about 50-200° C. with at least 2 parts by weight of a carboxylic acid anhydride and about 0.5-20 parts by weight of an aromatic monoisocyanate, which may be substituted in the aromatic ring by halogen atoms, nitro-, alkoxy-, alkyl-, and esterified carboxylic acid groups.

11. Process of claim 10 wherein the isocyanate is phenyl isocyanate.

12. A process of acylating a solid, film-forming high molecular polyoxymethylene which comprises contacting 1 part by weight of said high molecular polyoxymethylene at temperatures of about 50-200° C. with at least 2 parts by weight of a carboxylic acid anhydride and about 0.5-20 parts by weight of monoisocyanates containing urethane groups, obtained by reaction of 1 mol of an organic diisocyanate with 1 mol of a monohydric alcohol.

13. A process of acylating a solid, film-forming high molecular polyoxymethylene which comprises contacting 1 part by weight of said high molecular polyoxymethylene at temperatures of about 50-200° C. with at least 2 parts by weight of a carboxylic acid anhydride and about 0.5-20 parts by weight of a diisocyanate selected from the group consisting of aliphatic and cycloaliphatic diisocyanates.

14. A process of acylating a solid, film-forming high molecular polyoxymethylene which comprises contacting 1 part by weight of said high molecular polyoxymethylene at temperatures of about 50-200° C. with at least 2 parts by weight of a carboxylic acid anhydride and about 0.5-20 parts by weight of aromatic diisocyanates which may be substituted in the aromatic ring by halogen atoms, nitro-, alkoxy-, alkyl-, and esterified carboxylic acid groups.

15. Process of claim 14 wherein the diisocyanate is tolyl-2,4-diisocyanate.

16. A process of acylating a solid, film-forming high molecular polyoxymethylene which comprises contacting 1 part by weight of said high molecular polyoxymethylene at temperatures of about 50–200° with at least 2 parts by weight of a carboxylic acid anhydride and about 0.5–20 parts by weight of a compound selected from the group consisting of di- and triisocyanates as they are obtained by (a) reaction of 1 mol of a dihydric alcohol with 2 mols of a diisocyanate and (b) by reaction of 1 mol of a trihydric alcohol with 3 mols of a diisocyanate.

17. A process of acylating a solid, film-forming high molecular polyoxymethylene which comprises contacting 1 part by weight of said high molecular polyoxymethylene at temperatures of about 50–200° C. with at least 2 parts by weight of a carboxylic acid anhydride and about —.5–20 parts by weight of an organic isocyanate selected from the group consisting of diphenylmethane-4,4-diisocyanate, diphenylsulfide-4,4-diisocyanate, and 1-methoxybenzene-2,4-diisocyanate.

18. A process of acylating a solid, film-forming high molecular polyoxymethylene which comprises contacting 1 part by weight of said high molecular polyoxymethylene at temperatures of about 50–200° C. with at least 2 parts by weight of a carboxylic acid anhydride and about —.5–20 parts by weight of an isocyanate selected from the group consisting of hexamethylenediisocyanate, tetramethylenediisocyanate, benzylisocyanate, and cyclohexane-1,4-diisocyanate.

References Cited in the file of this patent

UNITED STATES PATENTS 2,296,249     Austin et al. _____ Sept. 22, 1942

FOREIGN PATENTS 770,717     Great Britain _____ Mar. 20, 1957